United States Patent
Rope

(10) Patent No.: US 9,900,088 B2
(45) Date of Patent: *Feb. 20, 2018

(54) ENHANCED DIGITAL DIAGNOSTICS FOR OPTICAL PAM APPARATUS

(71) Applicant: INPHI CORPORATION, Santa Clara, CA (US)

(72) Inventor: Todd Rope, Glendale, CA (US)

(73) Assignee: INPHI CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/693,856

(22) Filed: Sep. 1, 2017

(65) Prior Publication Data
US 2017/0366259 A1     Dec. 21, 2017

Related U.S. Application Data

(63) Continuation of application No. 15/490,555, filed on Apr. 18, 2017, now Pat. No. 9,780,869, which is a continuation of application No. 15/069,702, filed on Mar. 14, 2016, now Pat. No. 9,660,730, which is a continuation-in-part of application No. 14/881,401, filed on Oct. 13, 2015, now Pat. No. 9,780,881.

(51) Int. Cl.
*H04B 10/079* (2013.01)
*H04L 27/06* (2006.01)
*H04B 10/60* (2013.01)

(52) U.S. Cl.
CPC ... *H04B 10/07953* (2013.01); *H04B 10/0795* (2013.01); *H04B 10/60* (2013.01); *H04L 27/06* (2013.01)

(58) Field of Classification Search
CPC .......... H04B 10/07953; H04B 10/0795; H04B 10/06; H04L 27/06
See application file for complete search history.

(56) References Cited

U.S. PATENT DOCUMENTS

| | | |
|---|---|---|
| 8,798,475 B2 | 8/2014 | Rope |
| 8,842,993 B2 | 9/2014 | Rope |
| 8,989,587 B2 | 3/2015 | Rope et al. |
| 2008/0069569 A1* | 3/2008 | Nelson .................. H04B 10/40 398/135 |
| 2009/0168858 A1* | 7/2009 | Luo ........................ H04B 10/40 375/224 |

OTHER PUBLICATIONS

"Specification for SFF Committee Cross Reference to Industry Products" SFF Committee, Feb. 9, 2015, pp. 1-11, SFF-8024 Rev. 2.8.
"Specification for Common Management Interface" SFF Committee, Nov. 7, 2014, pp. 1-57, SFF-8636 Rev 2.4.

* cited by examiner

*Primary Examiner* — Leslie Pascal
(74) *Attorney, Agent, or Firm* — Richard T. Ogawa; Ogawa P.C.

(57) ABSTRACT

A Pulse Amplitude Modulated (PAM) optical device utilizing multiple wavelengths, features a communications interface having enhanced diagnostics capability. New registers are created to house additional diagnostic information, such as error rates. The diagnostic information may be stored in raw form, or as processed on-chip utilizing local resources.

20 Claims, 20 Drawing Sheets

| Page | Register | Description |
|---|---|---|
| 20h | 128-133 | Latched alarm/warning flags for monitored parameters |
| 20h | 134-157 | Real-time values for monitored parameters |
| 20h | 158-163 | Interrupt mask values for monitored parameters |
| 20h | 164-187 | Parameter configuration registers |
| 20h | 188-189 | Lane mapping  1200 |
| 20h | 190-191 | Other configuration |
| 20h | 192-255 | Alarm/warning thresholds |

FIG. 12

| Page | Register | Bits | Description |
|---|---|---|---|
| 20h | 128 | 7:4 | Latched alarm/warning flags for monitored parameter 1 |
| 20h | 128 | 3:0 | Latched alarm/warning flags for monitored parameter 2 |
| 20h | 129 | 7:4 | Latched alarm/warning flags for monitored parameter 3 |
| 20h | 129 | 3:0 | Latched alarm/warning flags for monitored parameter 4 |
| 20h | 130 | 7:4 | Latched alarm/warning flags for monitored parameter 5 |
| 20h | 130 | 3:0 | Latched alarm/warning flags for monitored parameter 6 |
| 20h | 131 | 7:4 | Latched alarm/warning flags for monitored parameter 7 |
| 20h | 131 | 3:0 | Latched alarm/warning flags for monitored parameter 8 |
| 20h | 132 | 7:4 | Latched alarm/warning flags for monitored parameter 9 |
| 20h | 132 | 3:0 | Latched alarm/warning flags for monitored parameter 10 |
| 20h | 133 | 7:4 | Latched alarm/warning flags for monitored parameter 11 |
| 20h | 133 | 3:0 | Latched alarm/warning flags for monitored parameter 12 |

FIG. 13

| Page | Register | Bits | Description |
|---|---|---|---|
| 20h | 134-135 | All | Real-time value of monitored parameter 1 |
| 20h | 136-137 | All | Real-time value of monitored parameter 2 |
| 20h | 138-139 | All | Real-time value of monitored parameter 3 |
| 20h | 140-141 | All | Real-time value of monitored parameter 4 |
| 20h | 142-143 | All | Real-time value of monitored parameter 5 |
| 20h | 144-145 | All | Real-time value of monitored parameter 6 |
| 20h | 146-147 | All | Real-time value of monitored parameter 7 |
| 20h | 148-149 | All | Real-time value of monitored parameter 8 |
| 20h | 150-151 | All | Real-time value of monitored parameter 9 |
| 20h | 152-153 | All | Real-time value of monitored parameter 10 |
| 20h | 154-155 | All | Real-time value of monitored parameter 11 |
| 20h | 156-157 | All | Real-time value of monitored parameter 12 |

FIG. 14

| Page | Register | Bits | Description |
|---|---|---|---|
| 20h | 158 | 7:4 | Masks for monitored parameter 1 |
| 20h | 158 | 3:0 | Masks for monitored parameter 2 |
| 20h | 159 | 7:4 | Masks for monitored parameter 3 |
| 20h | 159 | 3:0 | Masks for monitored parameter 4 |
| 20h | 160 | 7:4 | Masks for monitored parameter 5 |
| 20h | 160 | 3:0 | Masks for monitored parameter 6 |
| 20h | 161 | 7:4 | Masks for monitored parameter 7 |
| 20h | 161 | 3:0 | Masks for monitored parameter 8 |
| 20h | 162 | 7:4 | Masks for monitored parameter 9 |
| 20h | 162 | 3:0 | Masks for monitored parameter 10 |
| 20h | 163 | 7:4 | Masks for monitored parameter 11 |
| 20h | 163 | 3:0 | Masks for monitored parameter 12 |

FIG. 15

| Page | Register | Bits | Description |
| --- | --- | --- | --- |
| 20h | 164-165 | All | Parameter configuration for monitored parameter 1 |
| 20h | 166-167 | All | Parameter configuration for monitored parameter 2 |
| 20h | 168-169 | All | Parameter configuration for monitored parameter 3 |
| 20h | 170-171 | All | Parameter configuration for monitored parameter 4 |
| 20h | 172-173 | All | Parameter configuration for monitored parameter 5 |
| 20h | 174-175 | All | Parameter configuration for monitored parameter 6 |
| 20h | 176-177 | All | Parameter configuration for monitored parameter 7 |
| 20h | 178-179 | All | Parameter configuration for monitored parameter 8 |
| 20h | 180-181 | All | Parameter configuration for monitored parameter 9 |
| 20h | 182-183 | All | Parameter configuration for monitored parameter 10 |
| 20h | 184-185 | All | Parameter configuration for monitored parameter 11 |
| 20h | 186-187 | All | Parameter configuration for monitored parameter 12 |

FIG. 16

| Bits | Description |
|---|---|
| 15:13 | Threshold ID. This number corresponds to which threshold set (1-8) will be used for this parameter. |
| 12:8 | Parameter type ( See FIG. 18 ) |
| 7:5 | Reserved |
| 4 | Parameter monitored at:<br>0 = Global module<br>1 = Channel-specific (see bits 1:0) |
| 3 | Parameter monitored at:<br>0 = Host side<br>1 = Line side |
| 2 | Parameter monitored at:<br>0 = Egress side (electrical receive or optical transmit depending on the value of bit 3)<br>1 = Ingress side (optical receive or electrical transmit depending on the value of bit 3) |
| 1:0 | Channel number, if the parameter is monitored channel-specific per bit 4. |

FIG. 17

| Value | Description |
|---|---|
| 0 | Parameter not supported. This value means that the module is not presenting any data on the corresponding real-time value, or latched flag registers. |
| 1 | SNR |
| 2 | Residual ISI/Dispersion |
| 3 | PAM-4 Histogram Parameter |
| 4 | Pre-FEC BER |
| 5 | Uncorrected BER |
| 6 | TEC Current |
| 7 | Laser Frequency |
| 8 | Laser Temperature |
| 9-24 | Reserved |
| 25-31 | Vendor-specific |

FIG. 18

| Page | Register | Bits | Description |
|---|---|---|---|
| 20h | 188 | 3:0 | Line side mapping for electrical channel 1 |
| 20h | 188 | 7:4 | Line side mapping for electrical channel 2 |
| 20h | 189 | 3:0 | Line side mapping for electrical channel 3 |
| 20h | 189 | 7:4 | Line side mapping for electrical channel 4 |

FIG. 20A

| Value | Description |
|---|---|
| 0 | Optical Lane 1, LSB |
| 1 | Optical Lane 1, MSB |
| 2 | Optical Lane 2, LSB |
| 3 | Optical Lane 2, MSB |
| 4-7 | Reserved |
| 8-15 | Vendor-specific mapping |

FIG. 20B

| Page | Register | Bits | Description |
|---|---|---|---|
| 20h | 190 | 7 | Error counter reset<br>1 = Reset error counters (clears back to zero automatically when the counters have been reset) |
| 20h | 190 | 6:0 | Reserved |
| 20h | 191 | All | Reserved |

FIG. 21

| Page | Register | Bits | Description |
|---|---|---|---|
| 20h | 192-199 | All | Threshold set 1, same order as other SFF-8436/SFF-8636 threshold sets |
| 20h | 200-207 | All | Threshold set 2, same order as other SFF-8436/SFF-8636 threshold sets |
| 20h | 208-215 | All | Threshold set 3, same order as other SFF-8436/SFF-8636 threshold sets |
| 20h | 216-223 | All | Threshold set 4, same order as other SFF-8436/SFF-8636 threshold sets |
| 20h | 224-231 | All | Threshold set 5, same order as other SFF-8436/SFF-8636 threshold sets |
| 20h | 232-239 | All | Threshold set 6, same order as other SFF-8436/SFF-8636 threshold sets |
| 20h | 240-247 | All | Threshold set 7, same order as other SFF-8436/SFF-8636 threshold sets |
| 20h | 248-255 | All | Threshold set 8, same order as other SFF-8436/SFF-8636 threshold sets |

FIG. 22

ENHANCED DIGITAL DIAGNOSTICS FOR OPTICAL PAM APPARATUS

CROSS-REFERENCE TO RELATED APPLICATION

The instant nonprovisional patent application is a Continuation of U.S. patent application Ser. No. 15/490,555 filed Apr. 18, 2017, which is a continuation of U.S. patent application Ser. No. 15/069,702 filed on Mar. 14, 2016 (now U.S. Pat. No. 9,660,730 issued May 23, 2017), which is a Continuation-in-Part of parent U.S. patent application Ser. No. 14/881,401 filed Oct. 13, 2015 and incorporated by reference in its entirety herein for all purposes.

BACKGROUND

The present invention relates to telecommunication techniques. More particularly, the present invention provides enhanced diagnostic capabilities for a Pulse Amplitude Modulated (PAM) optical device, although other applications are possible.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Progress in computer technology (and the continuation of Moore's Law) is becoming increasingly dependent on faster data transfer between and within microchips. Optical interconnects may provide a way forward, and silicon photonics may prove particularly useful, once integrated on the standard silicon chips. 40-Gbit/s and then 100-Gbit/s data rates DWDM optical transmission over existing single-mode fiber is a target for the next generation of fiber-optic communication networks. Everything is okay up to 10 Gbits/s, but beyond that, distortion and dispersion take their toll.

In order to meet the challenges of faster data communications with accuracy maintained, the use of multiple channels has been explored. This, however, leads to a more complex optical communications device, with a corresponding greater variety and volume of available diagnostic information. Therefore, improved devices with enhanced features are desired.

SUMMARY

A Pulse Amplitude Modulated (PAM) optical device utilizing multiple wavelengths, features a communications interface having enhanced diagnostics capability. New registers are created to house additional diagnostic information, such as error rates and other data. The diagnostic information may be stored in raw form, or as processed on-chip utilizing local available resources.

In general, the present invention provides a PAM optical device including enhanced diagnostics capability. The present invention achieves these benefits and others in the context of known optical technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 12 is a table showing a register overview for a new page storing additional diagnostic parameters for monitoring.

FIG. 13 is a table showing registers in the table of FIG. 12 for alarm/warning latches.

FIG. 14 is a table showing real-time value registers in the table of FIG. 12.

FIG. 15 is a table showing interrupt mask registers in the table of FIG. 12.

FIG. 16 is a table showing parameter configuration registers in the table of FIG. 12.

FIG. 17 is a table showing details of the parameter configuration of FIG. 16.

FIG. 18 is a table showing parameter type enumeration.

FIG. 20A is a table showing lane mapping registers in the table of FIG. 12.

FIG. 20B is a table showing lane mapping enumeration.

FIG. 21 is a table showing other configuration registers in the table of FIG. 12.

FIG. 22 is a table showing threshold registers in the table of FIG. 12.

DETAILED DESCRIPTION OF THE INVENTION

Figure 1:
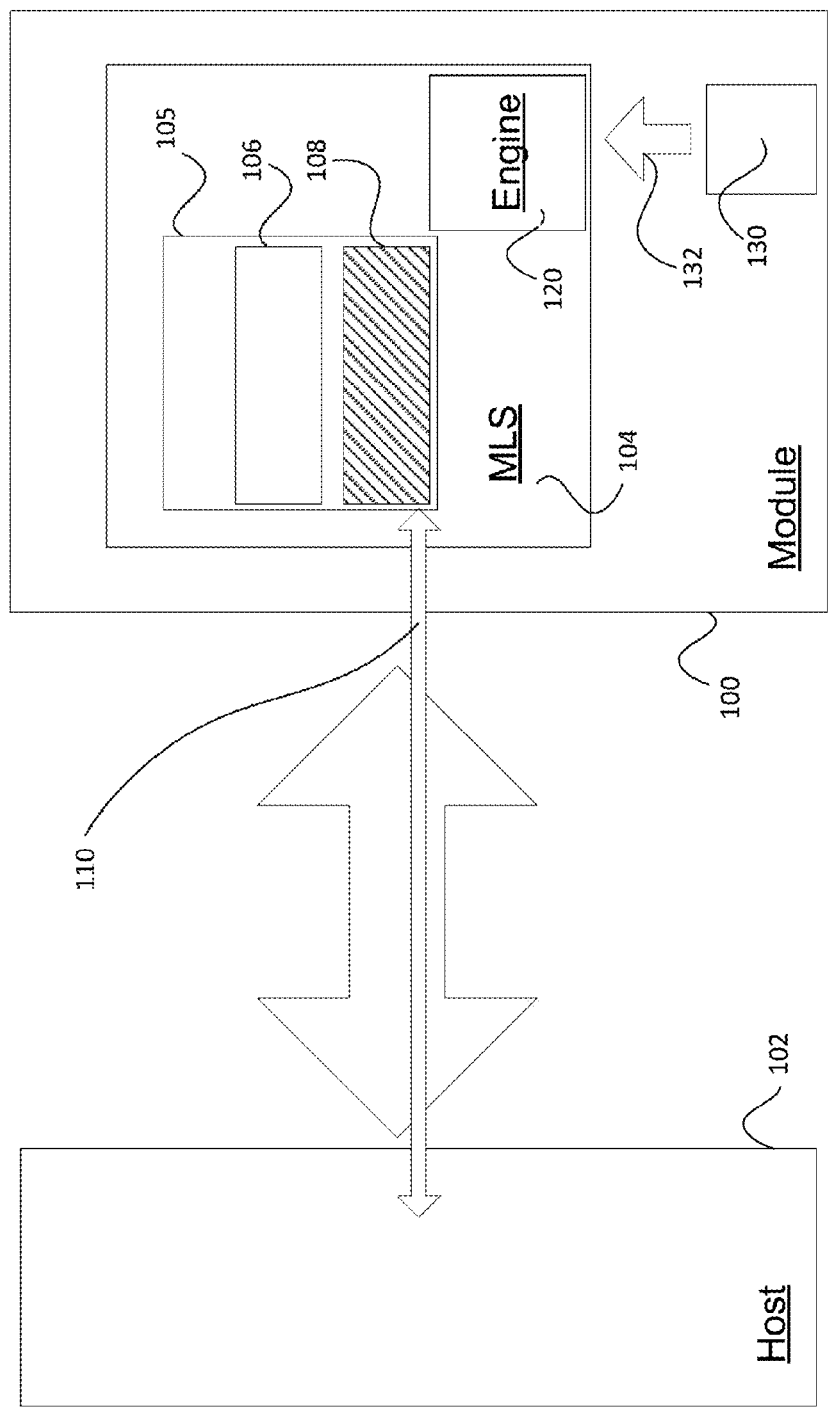
FIG. 1 is a simplified diagram illustrating interaction between a host and an optical communication module according to an embodiment.

In the last decades, with advent of cloud computing and data center, the needs for network servers have evolved. For example, the multiple-level switch/router configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM4, PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

A communications module that is capable of accurate transmission of data in electronic and digital form at high speeds, is complex. It offers many types of data useful for diagnostic purposes.

Moreover, the optical communications module may be designed to interact with a host according to particular industry standard(s). For example, incorporated by reference herein for all purposes, are the following existing standard MSA documents:

SFF-8636, Specification for Common Management Interface, Rev 2.4 (Nov. 7, 2014);

SFF-8024, Specification for Small Form Factor (SFF) Committee Cross Reference to Industry Products, Rev 2.8 (Feb. 9, 2015)

The information present in these documents, however, may not provide sufficient diagnostics data to identify and/or manage a complex optical PAM apparatus. Accordingly, embodiments provide enhanced digital diagnostics capability to an optical PAM apparatus, for example through the use of new register definitions and values added thereto.

FIG. 1 shows a simplified view of a communications interface 100 offering enhanced diagnostic capabilities according to an embodiment. In particular, communications interface 100 is in communication with host 102.

The communications interface includes an integrated circuit 104 comprising a non-transitory computer readable storage medium 105 including existing register(s) 106 that are configured to store data relating to its operation. The structure/organization of those existing registers, and the information stored therein, may be dictated according to an industry standard, for example the SFF-8636 and/or SFF-8024 standards mentioned above.

Those existing registers designed according to the industry standards, however, may be insufficient to store the volume of detailed information potentially useful for diagnostics of the advanced communications interface.

Accordingly, embodiments introduce to memory 105, new registers 108 that are configured to house additional information 110 relevant for diagnostic purposes. Multiple examples of such additional information are provided below, including but not limited to:

signal-to-noise ratios;
bit error rates;
frame errors;
level histogram parameters;
channel maps;
digital signal processing (DSP) parameters;
per-lane DSP Debug Memory outputs;
thermoelectric cooler (TEC) currents;
eye diagrams;
grid channel number;
wavelength error;
thresholds/Interrupts/Masks;
transceiver IC control; and
others.

The corresponding host should recognize, allow access to, and desirably fully support these added values, in order to reap the full diagnostic benefit of this enhanced capability.

Under some circumstances, the new registers may store the additional data in raw form (e.g., an error instance) as directly received from various components. That raw data may be ultimately transmitted to the host for further processing in order to produce finished data corresponding to recognized diagnostic parameters (e.g., an error rate over a time increment).

Under other circumstances, the new registers may store data in a finished form that is already recognizable as being relevant for diagnostic purposes. Such processing may take place in the host, with the processed data being returned to the interface.

Alternatively, in certain embodiments the raw data 132 from an optical module element 130 may be processed directly within the module itself, utilizing existing, locally available processing resources. This is generally referenced in FIG. 1 as engine 120.

Figure 2:
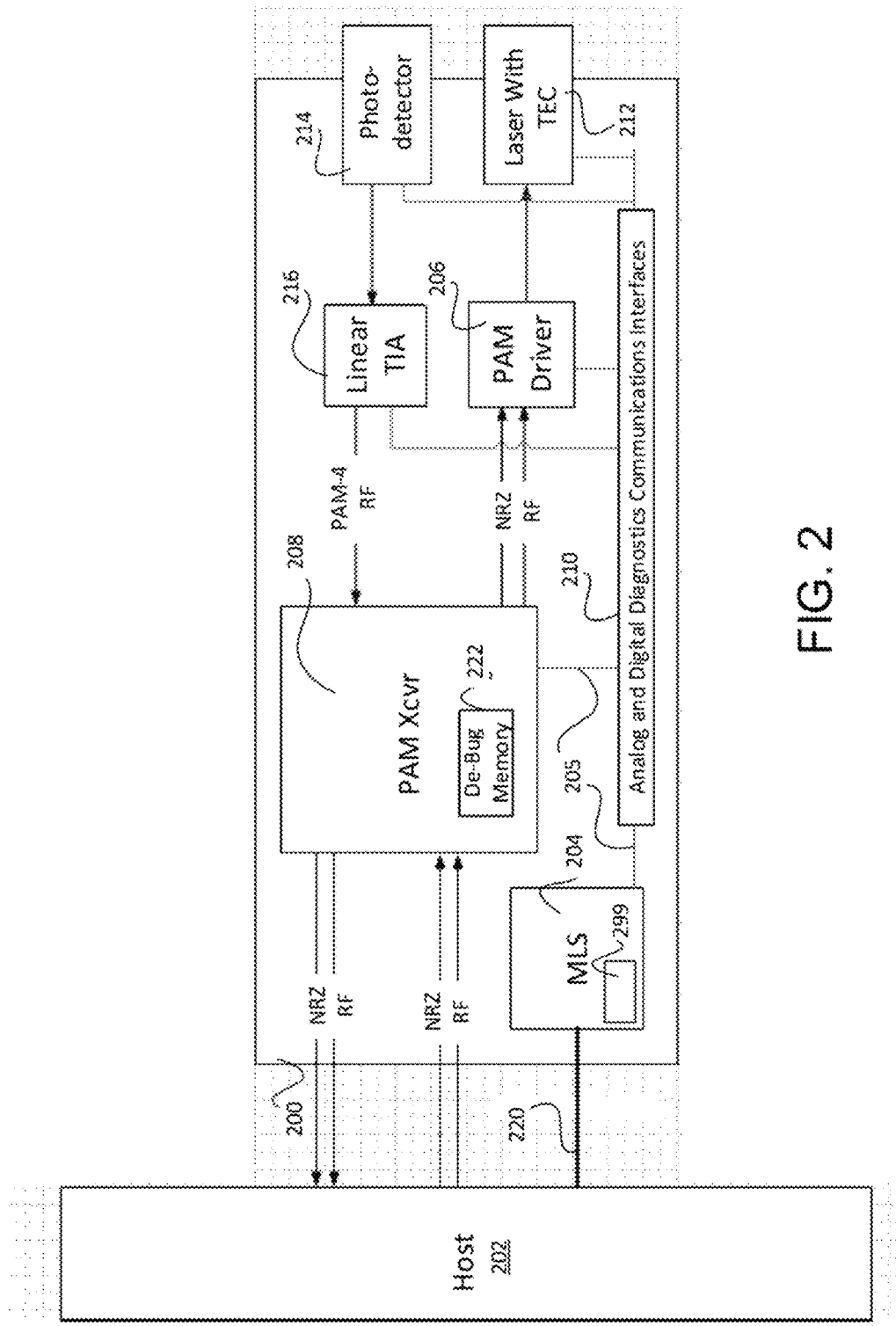
FIG. 2 is a simplified diagram illustrating an optical communication module according to an embodiment.

FIG. 2 shows a top level diagram illustrating elements of the optical communications module 200. In particular, communication between the module and the host 202 is run via a master logic system (MLS) 204, which can be a microcontroller, Field-Programmable Gate Array (FPGA), or similar system.

The optical communications module further comprises a PAM driver 206, as well as a PAM transceiver (Xcvr) chip 208. The MLS receives data from these components via the analog and digital diagnostics communications interfaces (collectively referenced here as 210).

The MLS may then translate the raw data from those chips into "human readable" form for presentation to the host via communications interface 220 (e.g., using the I2C standard or others). This processed diagnostic data can comprise eye diagrams, histograms, and others etc.

Thus, the MLS gathers data from all the other blocks and reports it to the host via the communications interface. While much of the diagnostic information comes from the PAM transceiver, data from other sources can be harvested as well.

For example, diagnostic information can be collected at the system level, or can come from other specific components of the communication module—e.g., including but not limited to the PAM driver 206, laser/TEC 212, photodetector 214, linear transimpedance amplifier (TIA) 216, and others, for example as are described below in FIG. 3.

Data potentially valuable for enhanced diagnostics purposes, may be communicated internally from the device to the host for analysis. And, as described later below, debugging data may offer a particularly useful source of such information.

In particular, FIG. 2 shows a debugging memory 222 that can be used to provide a stream 205 of data for post-processing and diagnostic purposes. This data collected at the debugging memory, can be passed via the communications interfaces to diagnostic logic residing in the MLS which includes a new register 299.

In FIG. 2, the MLS 204 and PAM Xcvr 208 are connected via a communications interface 210. The debug data is stored within the PAM Xcvr, but must be transmitted to the host 202, which is not directly connected.

An embodiment of a method for moving the diagnostic data from the PAM Xcvr to the host is as follows. First, the host writes a request for data into a register at the MLS using the serial communications interface 220.

The MLS then responds by querying the PAM Xcvr 208 for data related to the request. The data is broken up into blocks (e.g., of 120 bytes) since the MLS has limited memory capacity.

The host indicates which block of data is to be read by writing to a register. The host also indicates how much data is expected in the current block.

Next, the MLS sets the value of a separate register to indicate that the data is ready for download to the host.

The host then polls the data-ready register until it is informed that the data is ready.

The host then reads the data cache within the MLS via the serial communications interface.

The request/response structure could be as follows, kept within a 128-byte "page" as is typical of the existing standards:
  Byte 1: Feature Number (e.g., 0=Histogram data, 1=Eye Scan data, etc.)
  Byte 2: Block length (up to 120 bytes of data per block)
  Bytes 3-4: Block Number (0-65535, each block is 120 bytes of data, supporting up to 7864320 bytes per feature)
  Bytes 5-124: Data
  Bytes 125-128: Data error checking (e.g., CRC-32 or other error checking parameter)

The feature number, and corresponding number and length of data blocks could be specified in advance.

It is noted that FIG. 2 represents a simplified diagram showing only a single optical channel with PAM-4 encoding. However, this is not required and alternative embodiments may utilize different schemes.

Figure 3:
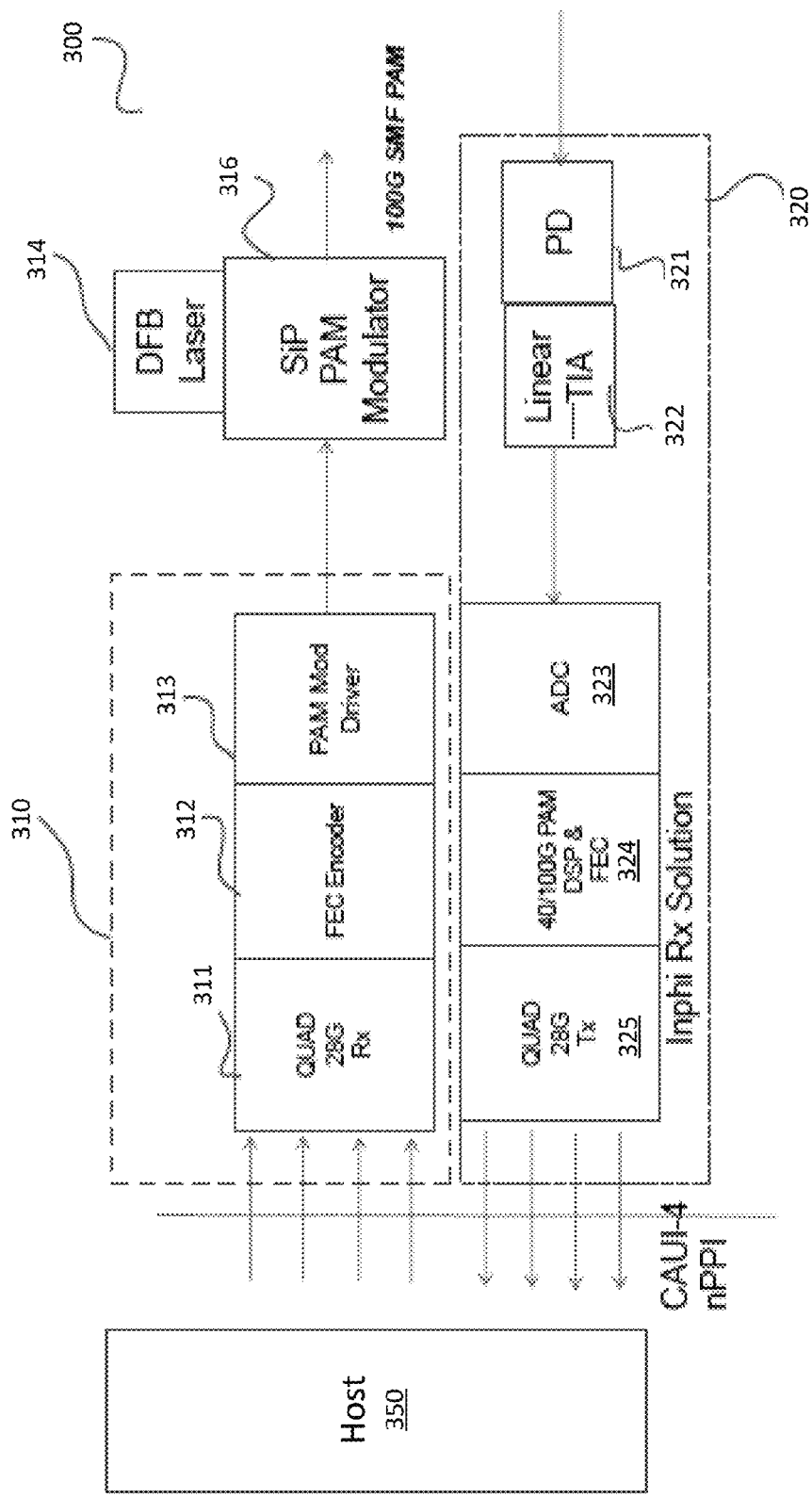
FIG. 3 is a simplified diagram illustrating further details of an optical communication module.

FIG. 3 is a simplified diagram illustrating details of an embodiment of an optical communication module 300. This diagram is merely one example, which should not unduly limit the scope of the claims. One of ordinary skill in the art would recognize many variations, alternatives, and modifications. The communication module 300 includes transmitter element 310 and a receiver element 320. The transmitter element 310 comprises a receiver 311, encoder 312, and PAM modulation driver 313.

In an embodiment, the communication module 300 is configured to receive incoming data at through four channels, where each channel is configured at 25 gigabits/s and configured as a PAM-2 format. Using the transmitter element 310, modulator 316, and the laser 314, the communication module 300 processes data received at 25 gigabits/s from each of the four incoming channels, and transmits PAM modulated optical data stream at a bandwidth of 100 gigabits/s. It is to be appreciated that other bandwidths are possible as well, such as 40 Gbps, 400 Gbps, and/or others.

As shown the transmitter element 310 receives 4 channels of data. It is to be appreciated that other variants of pulse-amplitude modulation (e.g., PAM4, PAM8, PAM12, PAM16, etc.), in addition to PAM-2 format, may be used as well. The transmitter element 310 comprises functional block 311, which includes a clock data recovery (CDR) circuit configured to receive the incoming data from the four communication channels. In various embodiments, the functional block 311 further comprises multiplexer for combining 4 channels for data. For example, data from the 4 channels as shown are from the PCE-e interface 650. For example, the interface to host 350 is connected to one or more processors. In a specific embodiment, two 2:1 multiplexers are employed in the functional block 311. For example, the data received from the four channels are high-speed data streams that are not accompanied by clock signals. The receiver 311 comprises, among other things, a clock signal that is associated with a predetermined frequency reference value. In various embodiments, the receiver 311 is configured to utilize a phase-locked loop (PLL) to align the received data.

The transmitter element 310 further comprises an encoder 312. As shown in FIG. 3, the encoder 312 comprises a forward error correction (FEC) encoder. Among other things, the encoder 312 provides error detection and/or correction as needed. For example, the data received may be a PAM-2 format as described above. The received data comprises redundancy (e.g., one or more redundant bits)

helps the encoder 312 to detect errors. In a specific embodiment, low-density parity check (LDPC) codes are used. The encoder 312 is configured to encode data received from four channels as shown to generate a data stream that can be transmitted through optical communication link at a bandwidth 100 gigabits/s (e.g., combining 4 channels of 25 gigabits/s data). For example, each received is in the PAM-2 format, and the encoded data stream is a combination of four data channels and is in PAM-8 format. Data encoding and error correction are used under PAM format.

The PAM modulation driver 313 is configured to drive data stream encoded by the encoder 312. In various embodiments, the receiver 311, encoder 312, and the modulation driver 313 are integrated and part of the transmitter element 310. Details regarding an example of a PAM modulation driver according to particular embodiments, are disclosed in U.S. Nonprovisional patent application Ser. No. 14/798,322, filed Jul. 13, 2015 and incorporated by reference in its entirety herein for all purposes.

The PAM modulator 316 is configured to modulate signals from the transmitter module 310, and convert the received electrical signal to optical signal using the laser 314. For example, the modulator 316 generates optical signals at a transmission rate of 100 gigabits per second. It is to be appreciated that other rate are possible as well, such as 40 Gbps, 400 Gbps, or others. The optical signals are transmitted in a PAM format (e.g., PAM-8 format, PAM12, PAM 16, etc.). In various embodiments, the laser 314 comprises a distributed feedback (DFB) laser. Depending on the application, other types of laser technology may be used as well, as such vertical cavity surface emitting laser (VC-SEL) and others.

This particular communication module 300 is configured for both receiving and transmitting signals. A receiver element 320 comprise a photo detector 321 that converts incoming data signal in an optical format converts the optical signal to an electrical signal. In various embodiments, the photo detector 321 comprises indium gallium arsenide material. For example, the photo detector 321 can be a semiconductor-based photodiode, such as p-n photodiodes, p-i-n photodiodes, avalanche photodiodes, or others. The photo detector 321 is coupled with an amplifier 322. In various embodiments, the amplifier comprises a linear transimpedance amplifier (TIA). It is to be appreciated by using TIA, long-range multi-mode (LRM) at high bandwidth (e.g., 100 Gb/s or even larger) can be supposed. For example, the TIA helps compensate for optical dispersion in electrical domain using electrical dispersion compensation (EDC). In certain embodiments, the amplifier 322 also includes a limiting amplifier. The amplifier 322 is used to produce a signal in the electrical domain from the incoming optical signal. In certain embodiments, further signal processing such as clock recovery from data (CDR) performed by a phase-locked loop may also be applied before the data is passed on.

The amplified data signal from the amplifier 322 is processed by the analog to digital converter (ADC) 323. In a specific embodiment, the ADC 323 can be a baud rate ADC. For example, the ADC is configured to convert the amplified signal into a digital signal formatted into a 100 gigabit per second signal in a PAM format. The functional block 324 is configured to process the 100 Gb/s data stream and encode it into four at streams at 25 Gb/s each. For example, the incoming optical data stream received by the photo detector 321 is in PAM-8 format at a bandwidth of 100 Gb/s, and at block 324 four data streams in PAM-2 format is generated at a bandwidth of 25 Gb/s. The four data streams are transmitted by the transmitter 325 over 4 communication channels at 25 Gb/s.

It is to be appreciated that there can be many variations to the embodiments described in FIG. 3. For example, different number of channels (e.g., 4, 8, 16, etc.) and different bandwidth (e.g., 10 Gb/s, 40 Gb/s, 100 Gb/s, 400 Gb/s, 3.2 Tb/s, etc.) can be used as well, depending on the application (e.g., server, leaf switch, spine switch, etc.).

In operation, the communication module 300 sends optical signal to another communication interface. More specifically, the transmitter module of one network interface sends signals over optical network to the receiver module of another network interface. More specifically, electrical signals are modulated and converted to optical signals. For example, the PAM modulation driver 313 sends PAM modulated electrical signals to the PAM modulator 316, which, together with the laser source 314, sends modulated optical signals out. It is to be appreciated that modulated optical signals according to embodiments may be modulated both in amplitude and phase.

EXAMPLES

A variety of features of an optical communication module may be available for capture and storage in order to provide enhanced diagnostics purposes. One such feature is grid channel number.

This grid channel number feature indicates the base International Telecommunications Union (ITU) grid channel number (center of the two λs). A possible (but not required) location for the new register storing this added information, is 20.

Another feature available for diagnostics is wavelength error. This feature describes error of laser frequency. Possible (but not required) locations for the new registers for this additional information, are 58-59 (λ1), 60-61 (λ2).

Still another possible feature available for diagnostic use, is thermoelectric cooler (TEC) current, e.g., in units of 0.1 mA. This represents generally is the amount of current flowing through the TEC, which is used to stabilize the frequency of the laser. Too much TEC current may be problematic, as the device will not be able to control the temperature/frequency of the laser. Possible (but not required) locations for the new registers storing this additional information, are 62-63 (λ1), 64-65 (λ2).

Residual dispersion is another feature that may be made available for enhanced diagnostics according to embodiments. This feature may be based on Finite Impulse Response (FIR) filter settings. Possible (but not required) locations for this new register are 66-67 (λ1), 68-69 (λ2).

The pre-Forward Error Correction (FEC) Bit Error Rate (BER) is another possible diagnostic feature that is made available according to particular embodiments. This feature represents a corrected error count from FEC.

A possible (but not required) location for this new register is 78-79 (λ1), 80-81 (λ2). Note, it is also possible to provide per-level BER by adding more registers.

Upon encountering a volume of corrected errors beyond a certain limit, FEC techniques may be unable to continue functioning with accuracy. Thus, a diagnostic technique according to embodiments may determine that the FEC is above that limit, and then estimate a BER based upon Signal-to-Noise Ratio (SNR).

Frame errors represent yet another possible feature that can be made available by enhanced diagnostics. Such frame error may be characterized as module frame error count (e.g., a number of frames having at least one error). A possible (but not required) location for this new register is 30-31.

Under certain circumstances, however, such a raw error count may offer limited value in diagnosing performance issues. Accordingly, embodiments may provide frame error other terms. One such alternative expression of error may be in errored seconds. That is, the diagnostic function may count a number of seconds in which at least one error is present. This errored seconds measure can aid in diagnosing error sources arising over only particular time periods.

Another possible available enhanced diagnostic feature comprises thresholds/interrupts/masks. In particular, relatively simple (e.g., monotonic—acceptable/unacceptable levels) diagnostic features that able to be implemented directly on-chip, can permit the implementation of thresholds and masks similar to other registers under the SFF-8636 standard. For example, an on-chip function could track raw error count and determine therefrom a BER. A relatively simple calculation could then determine whether that BER exceeds a threshold, with error counts exceeding that threshold triggering some further action for diagnostic purposes.

Still another possible feature available for advanced diagnostics is transceiver (Xcvr) IC control. This can comprise various bit-level control over the PAM IC, including but not limited to one or more of:
  FEC enable/disable;
  FEC mode.

It is further noted that diagnostic features provided according to various embodiments, may facilitate the starting and stopping of counters (e.g., counters for BER, frame errors SNR, etc.). Such low level management of counter activity within the chip may promote responsive diagnostic behavior without imposing an excessive burden on communication resources (e.g., with the host to frequently start/stop counters), and/or memory resources (e.g., to store counts above and beyond those pertinent to diagnosis of a particular issue).

Yet another diagnostic feature can be a channel map. This feature shows mapping of electrical lanes to optical lane/bit position. Examples can include but are not limited to:
  electrical lane 1→Optical Lane 1 Bit 1 MSB);
  electrical lane 2→Optical Lane 1 Bit 0 LSB);
  electrical lane 3→Optical Lane 2 Bit 1 MSB;
  electrical lane 4→Optical Lane 2 Bit 0 LSB.

This channel mapping may be useful to accommodate embodiments that allow user-configurable allocation of electrical lanes to optical lane/bit position. Such a configurable device may be useful to promote interoperability with external devices (e.g., as potentially supplied from other manufacturers).

Still other features may be available to offer enhanced diagnostics capability for a PAM optical module. For example, SNR may be accessed.

A SNR monitor may be based upon based upon an output estimating Mean Square Error (MSE), based on at least two error signals from the Digital Signal Processing. The MSE read-out can be translated to SNR in dB, which is the most basic link health indicator. Possible (but not required) locations for such new registers can be 70-71 ($\lambda$1), 72-73 ($\lambda$2).

Level histogram parameter is another possible diagnostic feature. This represents measurement of margin of level slicer or other parameters, determined via a level histogram.

Figure 4:
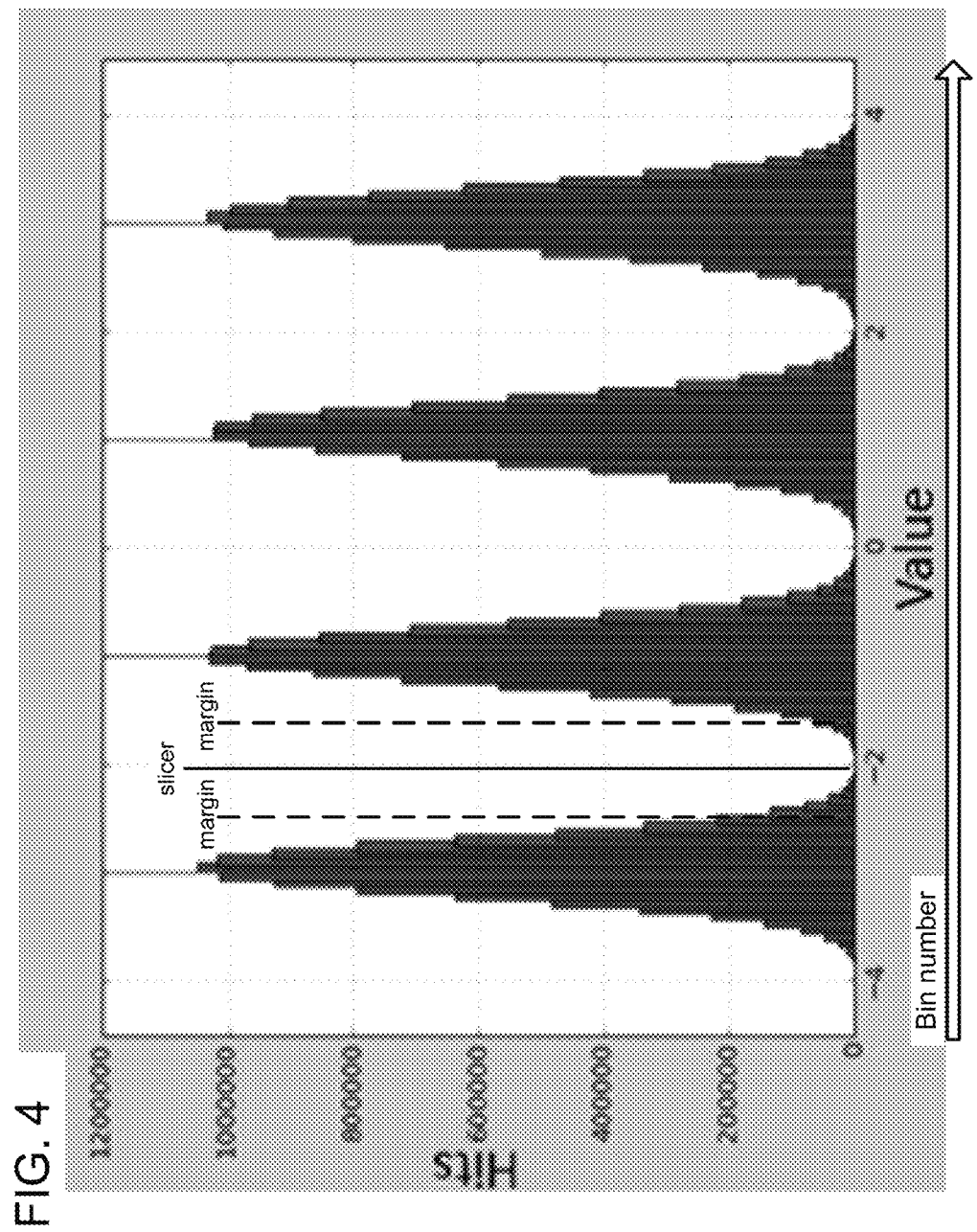
FIG. 4 shows a parameter level histogram.

For example, FIG. 4 shows a PAM4/NRZ Eye Histogram collected by populating post-EQ sample hits over N bins. Possible (but not required) new register numbers for this feature are 74-75 ($\lambda$1), 76-77 ($\lambda$2).

In this particular exemplary histogram of FIG. 4, a single bin saturates at 2^20 hits, where N=160 in PAM4 mode. This affords sufficient resolution on the sample distribution. Examples of such sample hits can include but are not limited to Feed Forward Equalizer (FFE) output, FFE+Decision Feedback Equalizer (DFE) output, etc. based on Digital Signal Processing (DSP) mode.

As shown in FIG. 4, such a histogram may be useful for implementing simple diagnostic efforts such as identifying a margin to slider. However, the histogram may also be valuable for performing other, more complex diagnostic efforts. Examples can include but are not limited to, eye-symmetry analysis, and analysis of the tail of the histogram to extrapolate BER, etc.

Still another possible diagnostic feature which may be made available, is per-lane DSP debug memory. Such an on-chip per-lane debug memory may be used for capturing data at various probe points within the DSP. Of particular note are the Analog to Digital Conversion (ADC) output and FFE output.

Figure 5:
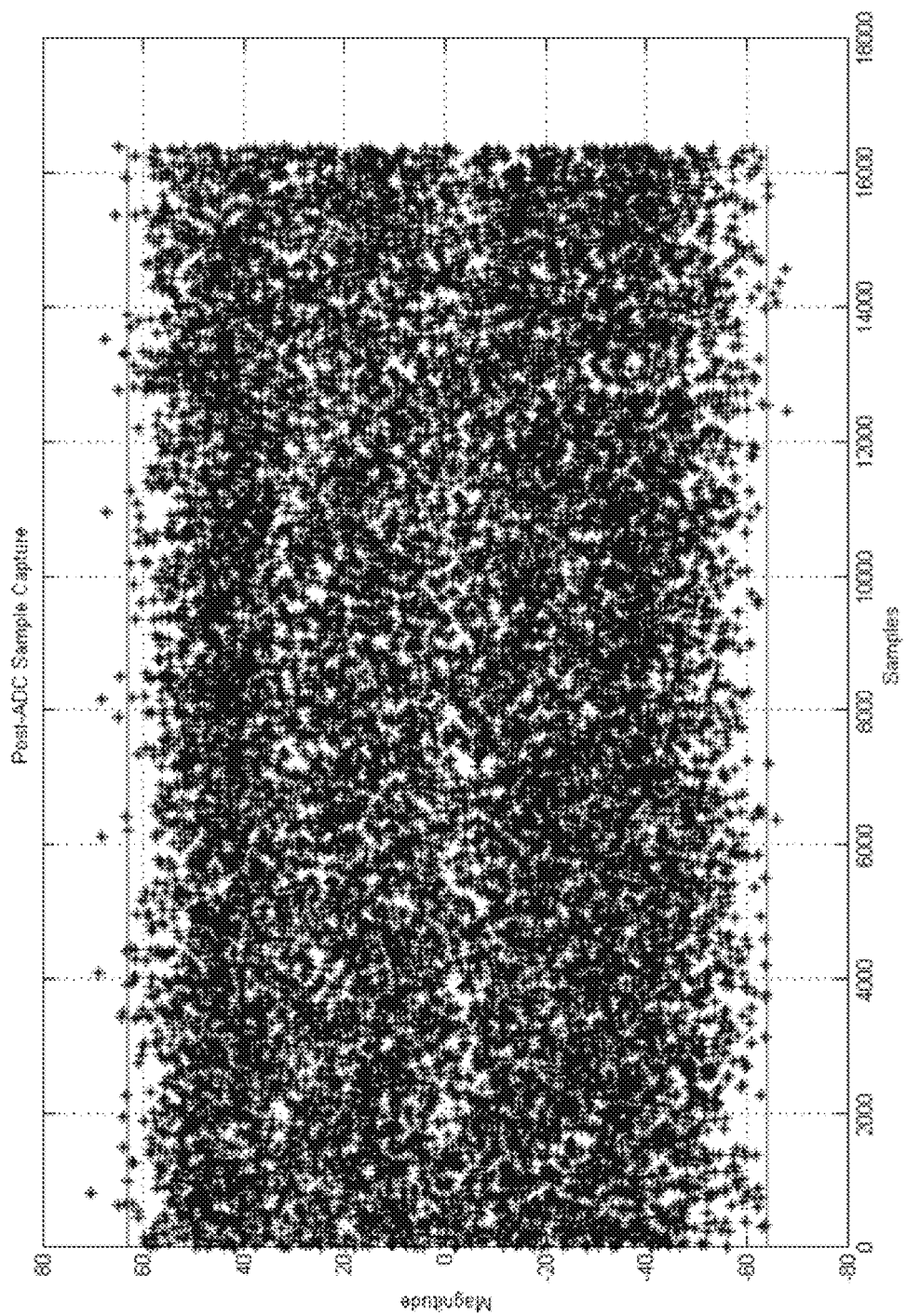
FIG. 5 shows post-Analog to Digital Conversion (ADC) sample capture.

FIG. 5 shows a post-ADC sample capture. The ADC output can be used to examine characteristics of incoming data. Usually the "eye" would be closed, but this data is still useful for post-processing when combined with read-out of other DSP parameters.

Figure 6:
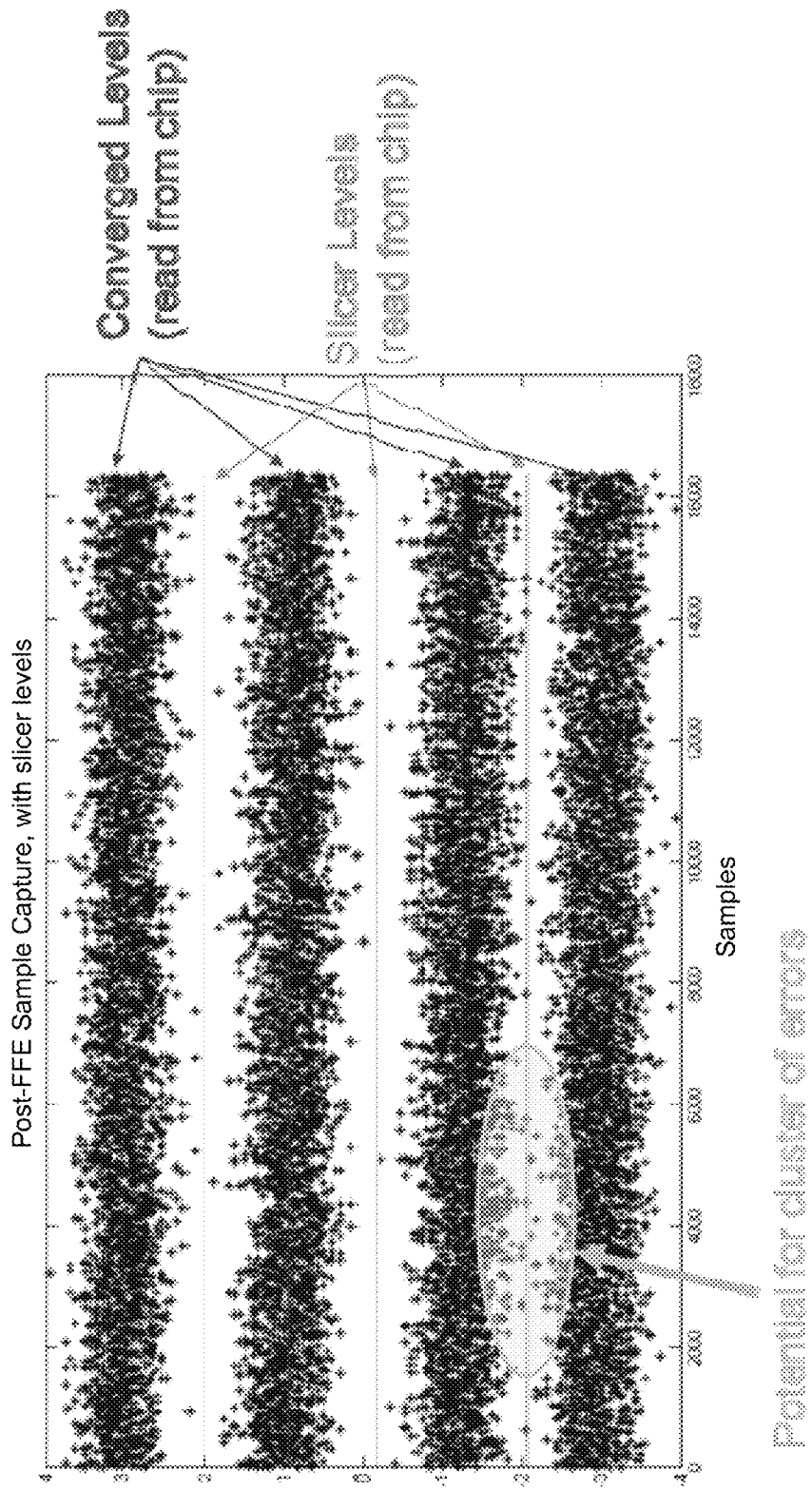
FIG. 6 shows post-Feed Forward Equalization (FFE) sample capture, with slicer levels.

FIG. 6 shows post-FFE sample capture, with slicer levels. Reading out the captured FFE output, combined with the slicer information can reveal information not only about the eye-opening and margins, but also the profile of the error events if any. This can be a useful tool in debugging FEC performance.

Digital Signal Processing (DSP) parameters represent another functionality useful in enhanced diagnostics. A number of different DSP parameters may be available to read-out through registers newly-created for this purpose.

Figure 7:
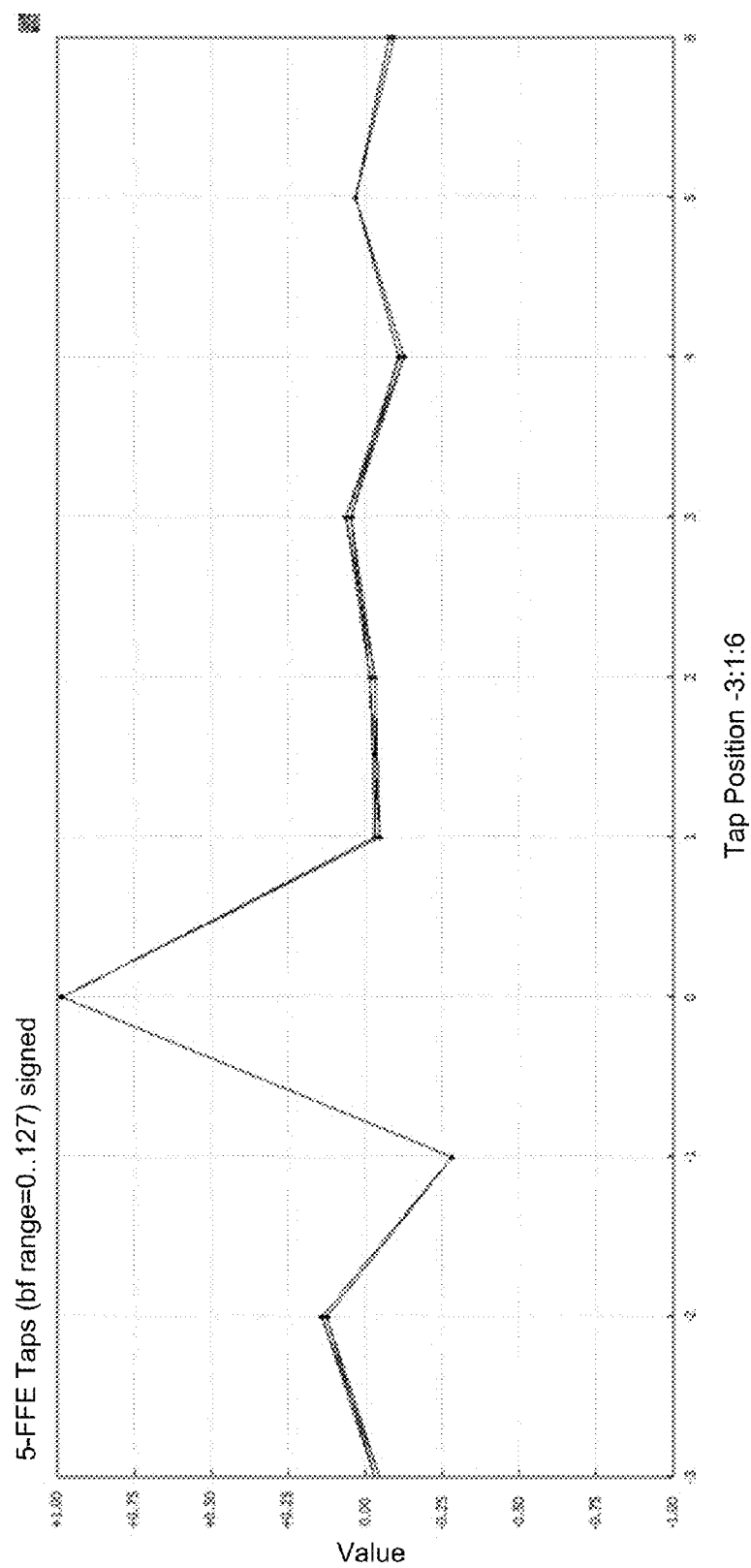
FIG. 7 is a sample plot of FFE Tap coefficient versus tap position.

One example of a DSP parameter potentially useful for diagnostic efforts, is FFE Tap coefficient. FIG. 7 is a sample plot of such coefficients versus tap position.

Other potentially DSP parameters potentially useful for diagnostic purposes, include but are not limited to PAM4 Levels, slicer thresholds, and DFE Tap coefficients.

Figure 8:
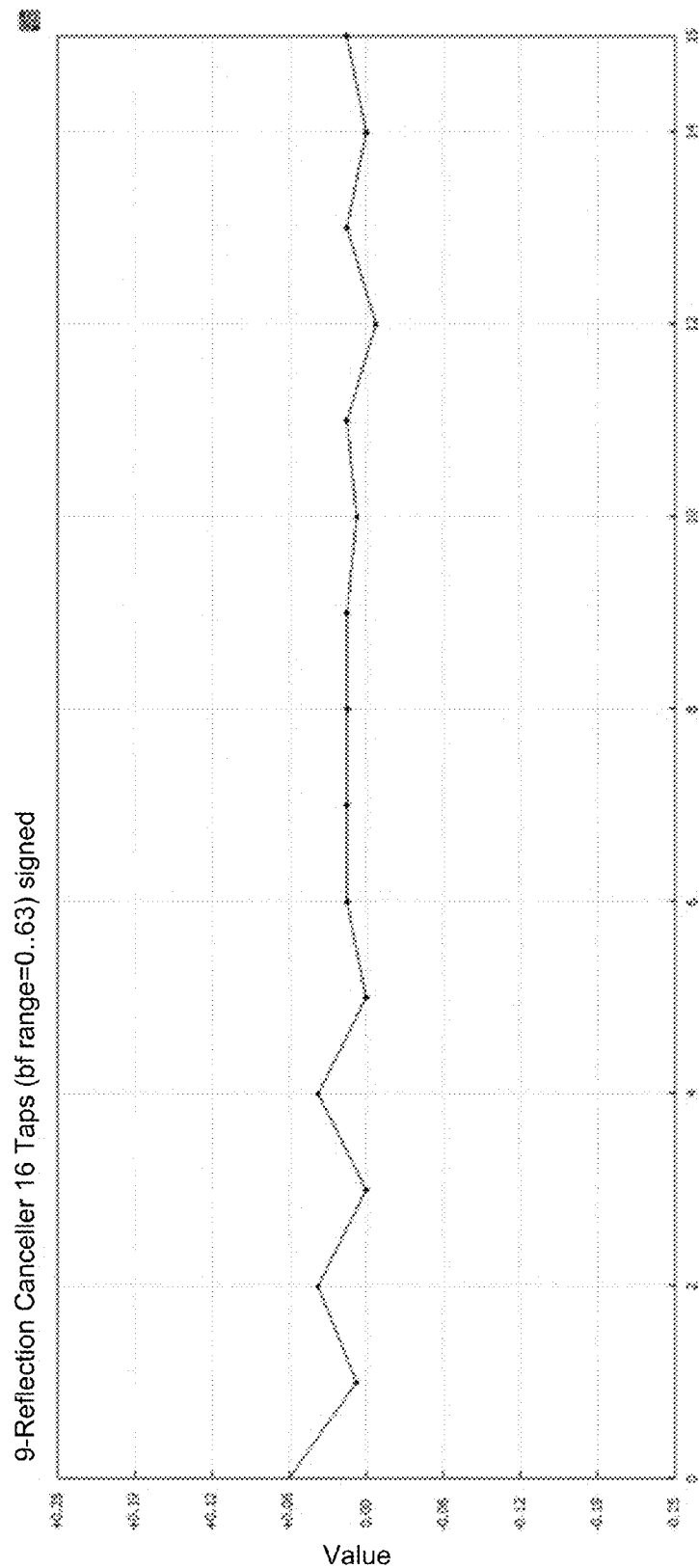
FIG. 8 is a plot of reflection-canceller coefficients over tap position.

Reflection-Canceller coefficients may also be useful for diagnostic purposes. FIG. 8 provides a sample plot of such coefficients over tap position.

Digital Timing Loop (DTL) parameters may also be useful. The Kf accumulator value can be translated to extract lane frequency PPM offset. The DTL code readout can be accumulated to extract DTL phase/tracking noise.

Analog Front-End Gain and/or Continuous Time Linear Equalizer (CTLE) Equalization code may also be provided for diagnostic purposes. This allows assessment of the peak-peak value of the incoming signal. DC gain and high-frequency analog boost may be applied to the incoming signal.

Still other functions that may be made available for diagnostic purposes, include analog Front-End Gain, DC offset, and timing mismatch errors.

Figure 9:
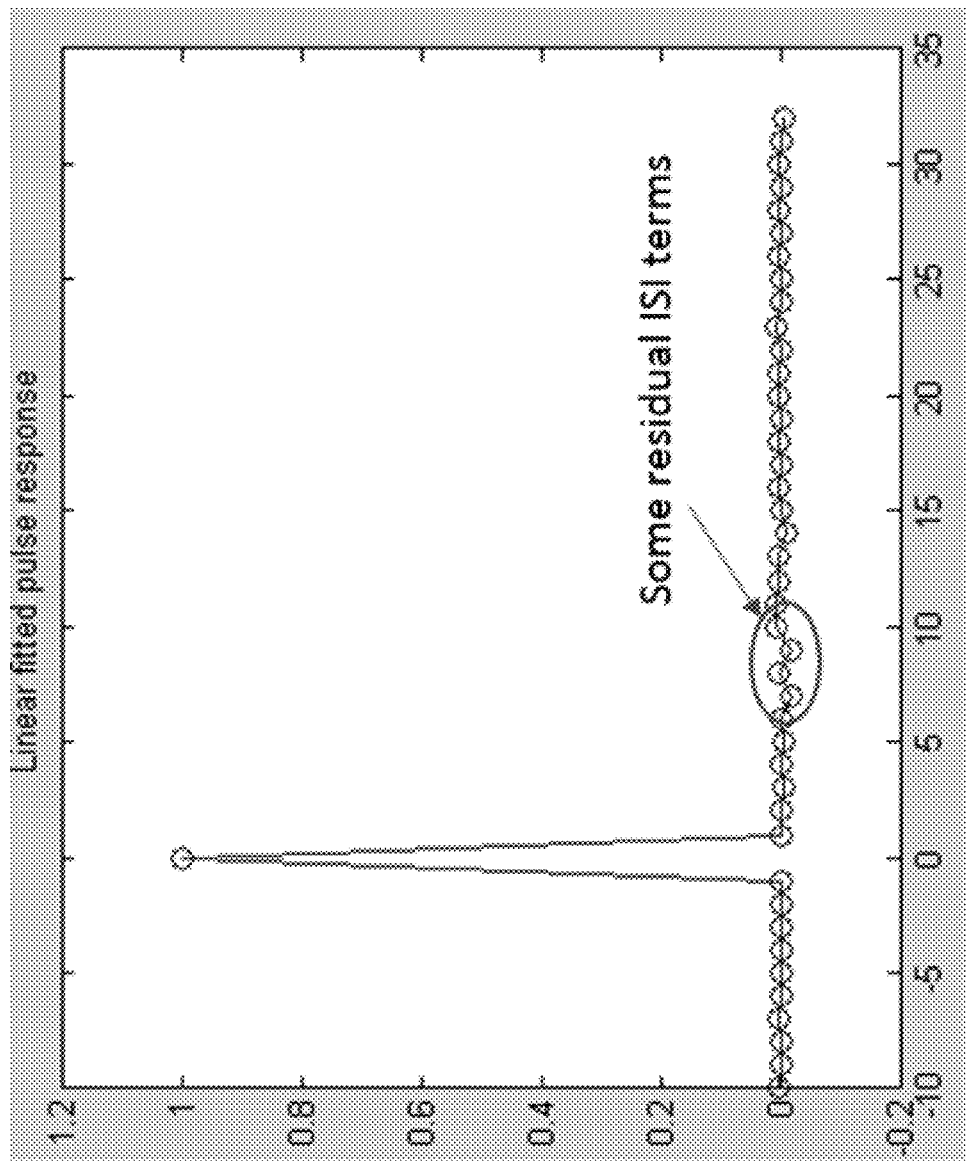
FIG. 9 is an extracted overall link pulse response highlighting residual Inter-Symbol Interference (ISI) components.

The above DSP parameter read-outs, combined with debug memory data captures can be used for deeper link budget analysis. For example, an overall link pulse response can be extracted which highlights any "linear" residual Inter-Symbol Interference (ISI) components. This is shown in FIG. 9.

Through further post-processing of the data, a finite link BER/SNR can be eventually broken-down to: Noise, Non-linearities (NL), Residual ISI and low-frequency DC baseline errors, etc. This is highlighted in the sample pie-chart of FIG. 10, with details now provided.

Specifically, the DSP core may include a debugging memory that harvests and stores a continuous stream of full rate data, for post-processing and diagnostic purposes. Typically, the ADC/equalizer output data (sampled synchronously at the Baud rate due to the timing recovery loop), can be collected at the debug memory and passed to the diagnostic logic residing in the MLS. The collected data can be used for at least the following.

Data collected at the debugging memory can be used to estimate link slicer SNR. The PAM chip estimates slicer SNR internally. The estimated SNR can be read through a register. The SNR is estimated as follows. The equalizer output data (an example of which is shown in FIG. 6), is sliced using the converged PAM levels and slicer thresholds (internally driven by a DSP control-loop). The discrepancy between the equalizer output and the expected value (i.e., the PAM level) is called an error signal. The PAM SNR is computed as a simple ratio between the average level power and the error signal mean square.

Data collected at the debugging memory can be used to estimate the total channel pulse response at the ADC/equalizer output. This can be done for example, with a simple least-square channel estimation technique. Symbols for channel estimation can either be provided by the symbol decisions inside the DSP, or by a Pseudo-Random Binary Sequence (PRBS) generator where PBRS data is used for diagnostics. The estimated channel pulse response provides several pieces of information on the combined link ISI. An example of estimated pulse response, after equalization, is shown in FIG. 9. This affords indication on the residual ISI after equalization, as can result from impedance mismatches, reflections . . . etc.

Data collected at the de-bugging memory can also provide non-linear ISI. Specifically, the estimated linear ISI component is first subtracted from the collected signal and serves as a non-linear ISI estimation. There are at least two ways to estimate non-linear ISI. A first approach is parametric, and the second is non-parametric. The parametric approach involves matching the residual signal to a specific form of non-linear ISI given by nonlinearity model (e.g., third order nonlinear compression, Volterra series . . . ). The nonparametric approach utilizes filling a look-up-table (LUT) with the average of the residual signal for each data pattern.

Noise characterization can be obtained from data from the debugging memory. That is, once the linear and nonlinear components are extracted from the collected signal, the remaining signal is used for noise characterization. This includes estimating the noise variance and correlation per data pattern.

Figure 10:
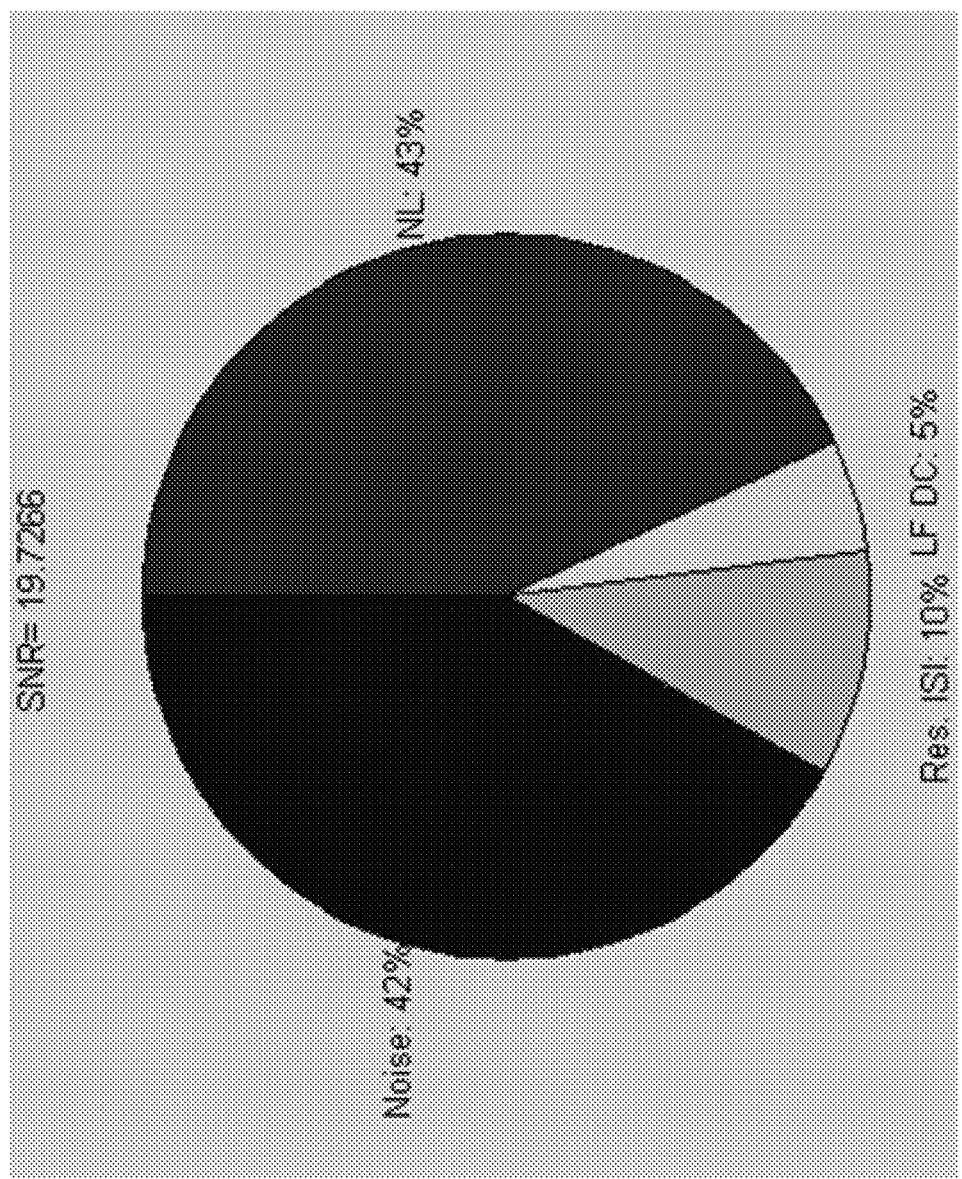
FIG. 10 is a pie chart breaking down Bit Error Rate (BER)/SNR to Noise, Non-linearities (NL), Residual ISI and low-frequency DC baseline errors.

Finally, once the linear, nonlinear and noise components are characterized, it is possible to clearly point to the limiting factor/factors in a given link. The pie chart of FIG. 10 is useful for this purpose.

Figure 11:
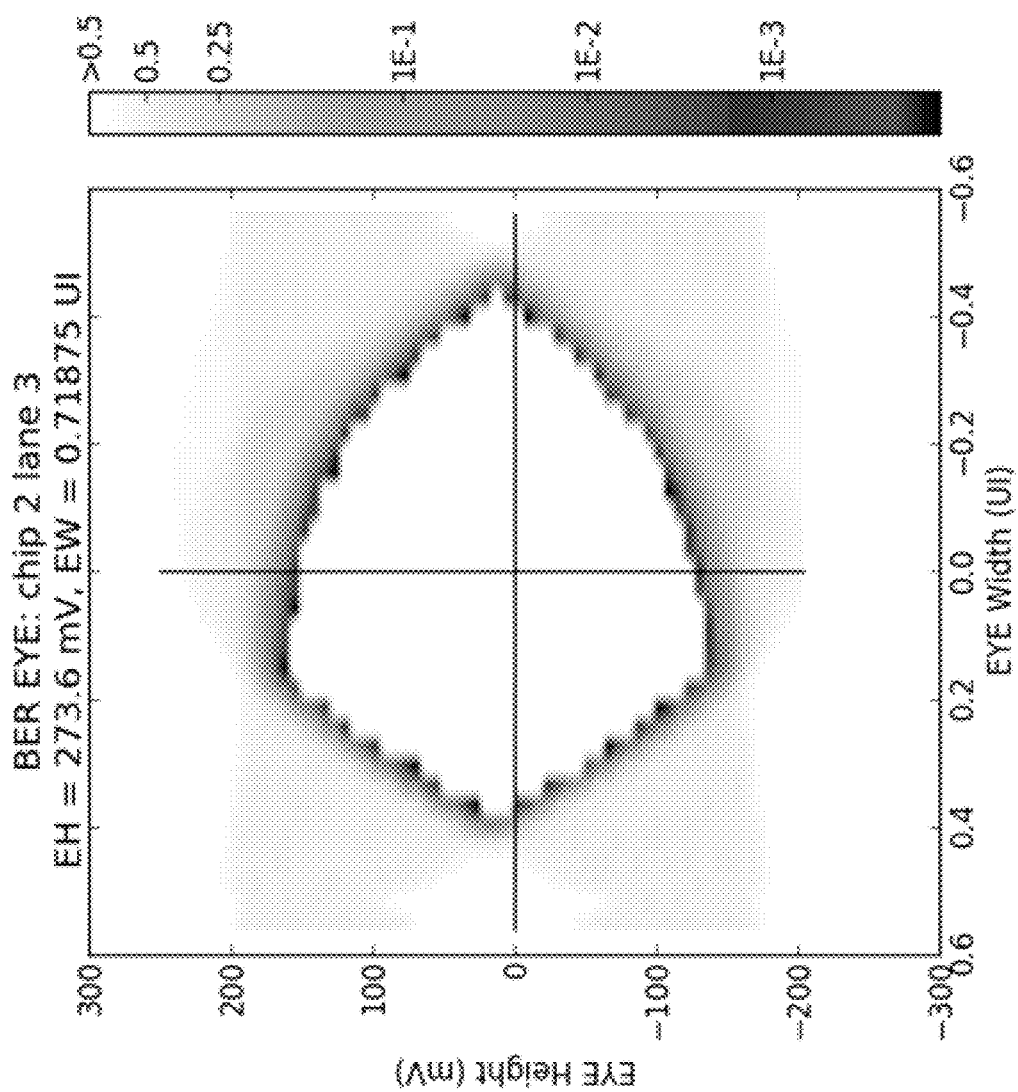
FIG. 11 shows a host eye-scan feature.

Receiver eye scan (e.g., under the CAUI 100 GbE standard) represents yet another function potentially useful for diagnostic purposes. The Host-side CAUI Rx(s) can support a 3D eye-scan feature. This is shown in FIG. 11.

It is to be appreciated that by using enhanced diagnostics according to various embodiments, the performance of a PAM module can be determined and updated, thereby allowing high data transmission rate and low error rate. Various embodiments can be implemented with existing systems. There are other benefits as well.

1A. An optical communication module comprising:
an optical transmitter element and an optical receiver element configured to handle communication of optical data and electronic data including digital signal processing (DSP); and a master logic control comprising a first register storing a first DSP parameter captured by a debugging memory, the master logic control configured to,
receive from the optical transmitter element or the optical receiver element, additional raw parametric information relating to the optical data or the electronic data,
cause an engine to process first DSP parameter with the additional raw parametric information to create second diagnostic information,
store the second diagnostic information in a new register, and
send the second diagnostic information to a host via a communications interface.

2A. The optical communication module of clause 1A wherein processing the first DSP parameter with the additional raw parametric information comprises extracting a pulse link response highlighting a residual linear Inter Symbol Interference (ISI) component.

3A. The optical communication module of clause 2A wherein the engine is further configured to break down a finite link Signal-to-Noise Ratio (SNR) into the residual linear ISI component and other components.

4A. The optical communication module of clause 3A wherein the other components comprise noise, non-linearities, and low-frequency direct current (DC) baseline errors.

5A. The optical communication module of clause 4A wherein:
the DSP parameter comprises a Digital Timing Loop (DTL) parameter;
a Kf accumulator value is translated to extract lane frequency offset; and
the noise is extracted by accumulating DTL readout.

6A. The optical communication module of clause 4A wherein:
the DSP parameter comprises analog front-end gain; and
the DC baseline errors are determined from Continuous Time Linear Equalizer (CTLE) Equalization code to assess a peak-peak value and identify DC gain and applied high-frequency analog boost.

7A. The optical communication module of clause 4A wherein:
the DSP parameter comprises analog front-end gain; and
the DC baseline errors are determined from DC offset and timing mismatch errors.

8A. The optical communication module of clause 4A wherein the engine is further configured to process one or more of Feed Forward Equalization (FFE) tap coefficients, PAM4 levels, slicer thresholds, Decision Feedback Equalization (DFE) tap coefficients, and reflection-canceller coefficients.

9A. The optical communication module of clause 1A wherein:
the first DSP parameter comprises a Feed Forward Equalization (FFE) output;
the additional raw parametric information comprises slicer information; and
the second diagnostic information comprises a Bit Error Rate (BER) of a Forward Error Correction (FEC) function.

10A. The optical communication module of clause 1A wherein the first DSP parameter comprises an Analog-to-Digital Conversion (ADC) output.

11A. The optical communication module of clause 1A wherein the second diagnostic information comprises an eye diagram.

12A. The optical communication module of clause 1A wherein the second diagnostic information comprises an eye histogram collected by populating post-equalization sample hits until a single bin saturates.

13A. The optical communication module of clause 1A wherein the second diagnostic information comprises a signal-to-noise ratio (SNR).

14A. The optical communication module of clause 13A wherein:
the first DSP parameter comprises a first error signal;
the additional raw parametric data comprises a second error signal from the DSP; and
the SNR is an estimated Mean Square Error (MSE) based upon the first error signal and the second error signal.

15A. The optical communication module of clause 1A wherein the second diagnostic information comprises a frame error.

16A. The optical communication module of clause 15A wherein the frame error comprises a module frame error count or errored seconds.

17A. The optical communication module of clause 1A utilizing forward error correction (FEC), wherein the second diagnostic information is selected from a FEC bit error rate, a FEC mode, and a FEC enable/disable.

18A. The optical communication module of clause 17A wherein the second diagnostic information comprises a bit error rate (BER).

19A. The optical communication module of clause 18A wherein further comprising another new register and the BER comprises a per-level BER.

20A. The optical communication module of clause 19A wherein above a FEC limit, the BER is estimated based on Signal-to-Noise Ratio (SNR).

1B. A method comprising:
collecting data in a debugging memory of an optical transceiver;
communicating the data to diagnostic logic of a controller; and
processing the data to produce a diagnostic output.

2B. The method of clause 1B wherein:
the data comprises equalizer output data; and
the diagnostic output comprises an estimated link slicer signal-to-noise ratio (SNR) produced by, slicing the equalizer output data using converged PAM levels and slicer thresholds internally driven by a DSP control-loop,
labeling a discrepancy between the equalizer output and an expected PAM level as an error signal, and
calculating the estimated link slicer SNR as a ratio between an average level power and an error signal mean square.

3B. The method of clause 1B wherein:
the data comprises equalizer output data; and
the diagnostic output comprises an estimated channel pulse response produced by a least-square channel estimation employing a symbol provided by a symbol decision within a digital signal processor (DSP) or a Pseudo-Random Binary Sequence (PRBS) generator.

4B. The method of clause 3B further comprising determining a linear residual linear Inter Symbol Interference (ISI) component from the estimated channel pulse response.

5B. The method of clause 4B further comprising determining a non-linear ISI component by subtracting the residual linear ISI component from a signal.

6B. The method of clause 4B further comprising matching the residual component to a form of non-linear ISI according to a nonlinearity model.

7B. The method of clause 4B further comprising filling a look-up-table (LUT) with an average of the residual component for each data pattern.

8B. The method of clause 4B further comprising:
extracting the linear ISI component and a non-linear ISI component from a signal to leave a remaining signal; and
performing noise characterization on the remaining signal by estimating a noise variance and correlation per data pattern.

9B. The method of clause 1B wherein the diagnostic logic processes the data to produce the diagnostic output.

10B. The method of clause 9B further comprising communicating the diagnostic output across an interface to a host for further diagnostic processing.

As has been described above, a number of additional parameters may be supported by embodiments with advanced modulation techniques. To allow monitoring of these parameters a new page in the SFF-8436/SFF-8636 memory space can be utilized. Here, a new Page 20h is assigned to monitor these parameters.

The basic monitoring techniques will be the same as for other monitored parameters (i.e., they will support current value, latched warning/alarm status, masks, and thresholds). For alarm and warning flags and masks, as in SFF-8436/SFF-8636 the highest bit number will be used for high-alarm, followed by low-alarm, high-warning, and low-warning in descending bit order.

For enhanced modulation techniques such as PAM-4, there may be a different number of optical channels than electrical channels. Accordingly, embodiments include a logical mapping feature to identify those electrical channels operating on particular optical channels.

For modules supporting error counters a counter reset bit is provided at register 191, bit 7 of the new Page 20h.

For a module implementing a Dense Wave Division Multiplexing (DWDM) optical interface, there may be a benefit in providing access to additional diagnostic monitoring parameters specifically for a DWDM module. In DWDM, the wavelength and/or frequency of the laser represent important parameters. Hence monitoring of laser frequency and/or wavelength allows the health of the laser to be known.

Frequency error may be determined by using deviation of the laser temperature from target as a proxy. In addition, DWDM modules typically use a TEC to control the laser temperature. The current flowing through the TEC is a strong indicator of the health of the module. A warning or error indication in any of these parameters can be an early indication of pending module failure.

Not all possible features will be supported by all modules or on all channels. To address this situation, embodiments allow the module to determine those parameters being monitored, and in association with which aspects of the module.

Some parameters may be module-level in scope, and some may be channel-specific. Some may be ingress-path related and some egress-path related.

In a particular embodiment, this information is conveyed by the module to the host in the parameter configuration registers 164-187 shown in FIG. 16 discussed later below. Up to eight independent parameters can be managed with up to eight different threshold values. Additional parameters (up to twelve total in this embodiment) can be managed, provided that they share threshold values (e.g., a same parameter monitored on different channels).

Finally, to facilitate later-added functionality without requiring additional specification changes, the parameter configuration registers may support an enumerated value for the specific parameter to be monitored. It is expected that the official list of which enumeration values correspond to what measurement and units, will be managed in SFF-8024 (similar to other enumeration values in the SFF-8436/SFF-8636 specification).

A brief description of newly monitored parameters for PAM-4, is now provided. These monitored parameters have also been discussed previously above.

One newly monitored parameter is SNR. This feature measures the signal-to-noise ratio of the electrical data present on the channel. This parameter can be interpreted as 8.8 fixed decimal. For example, an MSB value of 13h and LSB value of 80h will be interpreted as an SNR of 19.5.

Another newly monitored parameter is residual ISI/dispersion. This feature measures the amount of correction being done by the module to account for residual intersymbol interference. The usual cause for this is optical dispersion, so this measurement is a proxy for residual (uncorrected) optical dispersion that is being corrected by the module. This parameter is unitless, and the threshold alarm and warning values will give an indication of the severity of the uncorrected dispersion.

Still another newly monitored parameter is the PAM Histogram parameter. This feature measures the rate of measured signal on the line that has an analog level near the cutoff for a PAM bit transition (e.g., 0<->1, 1<->2, 2<->3). This parameter is unitless and the threshold alarm and warning values will give an indication of the magnitude of the rate of analog measurements near the cutoff points.

Note that for this parameter, there is no concept of a low alarm or warning, so the corresponding thresholds will be 0. Note also that there can be multiple transition points depending on the level of PAM encoding. For PAM-4 there will be 3 transition points. For PAM-8 there would be 7. This parameter simply sums the data from all transition points.

Yet another newly monitored parameter comprises error counters. This feature monitors the error rate for either the full 100G link or on a channel-by-channel basis. Two separate error counters may be maintained:

Uncorrected BER since last counter reset;

Pre-FEC BER since last counter reset.

The parameters may be represented as accumulated BER where the accumulation period is reset manually by the host. To do this, the register on page 20h, address 192, bit 7, may be set to 1.

Note that the thresholds system is maintained for BER and uncorrected errors. But, the low thresholds for BER and errors should be 0, and the high threshold for uncorrected errors should also be 0 unless other error correcting schemes are present.

BER parameters may be interpreted as an unsigned 16-bit floating point number with 5 bits for (base-10) exponent (offset by −24) and 11 bits for mantissa. Thus the format may be: $m*10^{s+o}$
where m ranges from 0 to 2047 (11 bits), s ranges from 0 to 31 (5 bits) and o is fixed at −24. Thus the smallest non-zero number is m=1 and s=0 or $10^{-24}$.

Certain parameters are newly monitored for DWDM. These are now discussed briefly below, and have also been described in detail above.

The TEC current parameter may be monitored. This parameter monitors the amount of current flowing to the TEC of a cooled laser. In a particular embodiment, this parameter is a 16-bit signed 2s complement value with a LSB unit of 0.1 mA. Thus, the total range is from −3.2768 A to +3.2767 A.

Laser frequency may also be monitored as a parameter. This parameter monitors the difference (in frequency units) between the target center frequency and the actual current center frequency. It is a similar measurement to the laser temperature (above), except expressed as a frequency difference instead of a temperature difference. Vendors may support one or the other measurement, or both. In an example laser frequency may be a 16-bit signed 2s complement value with a LSB unit of 10 MHz. Thus the total range is from −327.68 GHz to 327.67 GHz.

Laser temperature may also be monitored as a parameter. This parameter monitors the laser temperature difference between the target laser temperature for a cooled laser, and the actual current temperature. It is a similar measurement to the frequency error, except expressed as a temperature difference instead of a frequency difference. Again, vendors may support one or the other measurement, or both. In an example laser temperature may be a 16-bit signed 2s complement value with a LSB unit of 0.001° C. Thus the total range is from −32.768° C. to 32.767° C.

The various additional parameters now being monitored according to embodiments, may be stored in a memory space. In this particular example, a new page (Page 20h) in the SFF-8436/SFF-8636 memory space can be utilized for this purpose.

FIG. 12 is a table showing a register overview for the new page 20h. FIG. 12 shows that registers 128-133 of Page 20h are used to store latched alarm/warning flags for the monitored parameters.

FIG. 13 is a table showing registers for alarm/warning latches. In particular, these six bytes cover the latched alarm and warning flags for the monitored parameters specified by the parameter configuration registers. Each parameter has four bits, with the most-significant bit (MSB) representing the alarm high error, followed by alarm low, warning high, and warning low as with other alarm and warning flags. Note that the threshold against which the real-time value is compared to generate these alarms and warnings is specified in the Parameter Configuration Registers.

Returning to FIG. 12, in that table the registers 134-157 of the new Page 20h are used to store real-time values of monitored parameters. FIG. 14 is a table showing real-time value registers.

These twenty-four bytes contain the real-time value of the monitored parameters. They are to be interpreted as specified in the Parameter Configuration Registers. In addition, the module will compare these values to the corresponding thresholds indicated in the Parameter Configuration Registers to generate the appropriate alarms and/or warnings in the registers 128-133 described above. As with SFF-8436/SFF-8636, these parameters are stored with the MSB in the lower numbered address and the least-significant bit (LSB) stored in the higher numbered address.

Returning to FIG. 12, in that table the registers 158-163 of the new Page 20h are used to store interrupt mask values for monitored Parameters. FIG. 15 is a table showing interrupt mask registers.

These six bytes cover the interrupt masks for the latched alarm and warning flags. Each parameter has four bits, with the most-significant bit representing the alarm high error, followed by low alarm, high warning, and low warning as with other alarm and warning parameters. When a particular bit is a zero, then the corresponding flag will generate an interrupt if asserted. If the bit is one, then the interrupt will not be generated. As with the alarm and warning flag, for each parameter the highest bit number represents alarm high followed by alarm low, warning high and warning low masks.

Returning to FIG. 12, in that table the registers 164-187 of the new Page 20h are used to store Parameter Configuration Registers. FIG. 16 is a table showing parameter configuration registers.

This section of the register map determines how the real-time value registers, alarms and warnings, masks and thresholds are to be interpreted by the host. For each of the twelve possible monitored parameters, the monitoring point, parameter type, and threshold location are provided by the module. The parameter configuration is a 2-byte field which is now described.

In particular, the two bytes of the parameter configuration are stored MSB-first (MSB having the lower numbered address), defined according to the table of FIG. 17 showing parameter configuration details.

The parameter type value of FIG. 17, is taken from the table of FIG. 18 showing parameter type enumeration. In certain embodiments this table is stored in SFF-8024 along with other enumeration tables.

For enhanced modulation techniques such as PAM-4, there may be a different number of optical channels than electrical channels. For example, the simplified view of FIG. 2 above, shows the optical module having two electrical channels and one optical channel.

Figure 19:
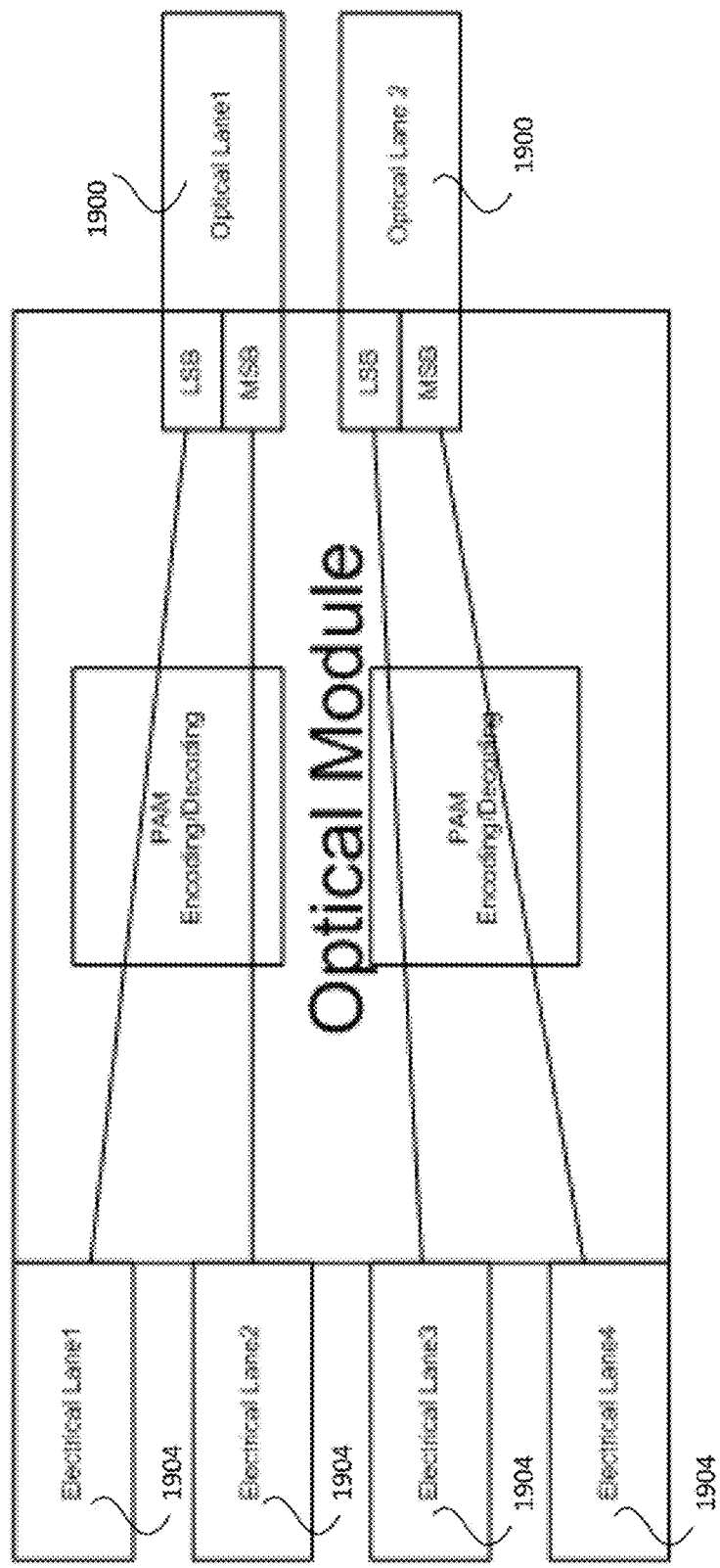
FIG. 19 is a simplified diagram illustrating mapping by the optical module.

Accordingly, embodiments store mappings that allow the host to retrieve the electrical to optical channel mapping. For a PAM-4 encoding, the electrical channel can be either mapped to the MSB or the LSB of the optical channel. FIG. 19 is a simplified diagram illustrating mapping by the optical module between a plurality of optical lanes 1900 and a plurality of electrical lanes 1904.

Each electrical channel has a 4-bit register in register 188 or 189 to define this mapping. FIG. 20A is a table showing lane mapping registers of the Lane mapping parameter 1200 of FIG. 12. The mapping may be defined as in the table of FIG. 20B showing lane mapping enumeration. This table may be stored in SFF-8024 as with other enumeration tables.

In particular embodiments, this mapping parameter is read-only. According to alternative embodiments, however, this parameter may be modified to allow active configuration of the mapping between optical and electrical channels.

Returning to FIG. 12, in that table the registers 190-191 of the new Page 20h are used to store other configuration registers. FIG. 21 is a table showing other configuration registers according to an embodiment.

In particular, this section contains a single bit that allows the host to reset the module error counters so that a recent BER can be presented. Its implementation is optional. If the module automatically restarts its error counters, then it is not necessary for the host to do so.

Returning again to FIG. 12, in that table the registers 192-255 of the new Page 20h are used to store alarm/warning thresholds. FIG. 22 is a table showing threshold registers.

In particular, this section contains the threshold registers against which the various parameters will be compared to determine if an alarm or warning flag should be generated. Each threshold set has four 2-Byte registers ordered MSB-first (lower numbered address contains MSB), and the registers are in the same order as other threshold registers in SFF-8436/SFF-8636: alarm high threshold, alarm low threshold, warning high threshold, warning low threshold.

While the above specification is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus comprising:
a receiver configured to handle communication of optical data received over a plurality of optical channels and a parameter of the optical data communicated over a plurality of electrical channels;
a debugging memory configured to collect and store the parameter from the receiver; and
a master logic control comprising a first register storing the parameter of the optical data captured by the debugging memory, the master logic control configured to,
receive from the receiver parametric information relating to the optical data,
store the parametric information;
process the parameter with the parametric information to create diagnostic information, and
store the diagnostic information in a second register.

2. The apparatus of claim 1 further comprising
a number of the plurality of optical channels that differs from a number of the plurality of electrical channels, the parametric information further specifying a channel mapping value.

3. The apparatus of claim 2 wherein the channel mapping value is actively configurable.

4. The apparatus of claim 2 wherein the optical data is encoded by PAM4.

5. The apparatus of claim 1 wherein the parameter specifies a PAM4 histogram parameter.

6. The apparatus of claim 1 wherein the parametric information further includes a value specifying parameter monitoring at a host side or at a line side.

7. The apparatus of claim 1 wherein the parametric information further includes a value specifying parameter monitoring at an ingress side or at an egress side.

8. The apparatus of claim 1 wherein the parametric information further includes a value specifying channel-specific parameter monitoring.

9. The apparatus of claim 1 wherein the parametric information specifies an optical source property comprising a frequency, a temperature, or a current.

10. The apparatus claim 1 wherein the parametric information indicates a bit error rate.

11. The apparatus of claim 1 wherein the parametric information indicates a signal-to-noise ratio.

12. A method comprising:
a debugging memory receiving from an optical receiver, parametric information relating to optical data incoming to the receiver;
streaming the parametric information from the debugging memory to a first register of a master logic system;
processing the optical data with the parametric information by the master logic system to create diagnostic information; and
storing the diagnostic information in a second register of the master logic system.

13. The method of claim 12 wherein the parametric information further includes a value specifying a threshold.

14. The method of claim 12 wherein the optical data is encoded by PAM4.

15. The method of claim 12 wherein the parametric information further includes a value specifying monitoring at a host side or at a line side.

16. The method of claim 12 wherein the parametric information further includes a value specifying monitoring at an ingress side or at an egress side.

17. The method of claim 12 wherein the parametric information further includes a value specifying channel-specific parameter monitoring.

18. The method of claim 12 wherein the parametric information specifies an optical source property comprising a frequency, a temperature, or a current.

19. The method of claim 12 wherein the parametric information indicates a bit error rate.

20. The method of claim 12 wherein the parametric information indicates an amount of correction to account for residual inter-symbol interference.

* * * * *